(12) United States Patent
Takada et al.

(10) Patent No.: US 10,960,506 B2
(45) Date of Patent: Mar. 30, 2021

(54) MACHINE TOOL

(71) Applicant: MAKINO MILLING MACHINE CO., LTD., Tokyo (JP)

(72) Inventors: Daisuke Takada, Aiko-gun (JP); Keisuke Tange, Aiko-gun (JP); Kazumasa Nakayasu, Aiko-gun (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 204 days.

(21) Appl. No.: 16/330,613

(22) PCT Filed: Sep. 9, 2016

(86) PCT No.: PCT/JP2016/076686
§ 371 (c)(1),
(2) Date: Mar. 5, 2019

(87) PCT Pub. No.: WO2018/047308
PCT Pub. Date: Mar. 15, 2018

(65) Prior Publication Data
US 2020/0262015 A1    Aug. 20, 2020

(51) Int. Cl.
*B23Q 11/08*    (2006.01)
*B23Q 3/157*    (2006.01)
(Continued)

(52) U.S. Cl.
CPC ...... *B23Q 3/15526* (2013.01); *B23Q 11/0042* (2013.01); *B23Q 11/08* (2013.01);
(Continued)

(58) Field of Classification Search
CPC ............... Y10T 483/03; Y10T 483/179; Y10T 483/1793; Y10T 483/1795;
(Continued)

(56) References Cited

U.S. PATENT DOCUMENTS 5,181,898 A * 1/1993 Piotrowski ............... B23Q 1/66
29/DIG. 56
5,871,326 A * 2/1999 Haninger ................. B23Q 7/04
414/225.01
(Continued)

FOREIGN PATENT DOCUMENTS

CN    1275467 A    12/2000
CN    1915586 A    2/2007
(Continued)

*Primary Examiner* — Erica E Cadugan
*Assistant Examiner* — Michael Vitale
(74) *Attorney, Agent, or Firm* — Morrison & Foerster LLP

(57) ABSTRACT

This machine tool is provided with: a partition that partitions a machining chamber and a tool storage chamber and that has an opening; a shutter; and a receiving member that is formed so as to receive cutting fluid. The partition includes a sidewall member that extends in the vertical direction and an inclined wall member inclined in such a manner so as to become lower from the sidewall member to the interior of the machining chamber. At least part of the opening is formed in the inclined wall member. The receiving member is positioned beneath the shutter, and in such a position so as to receive cutting fluid that drops down along the sidewall member when the shutter is opened.

5 Claims, 9 Drawing Sheets

(51) Int. Cl.
*B23Q 11/10* (2006.01)
*B23Q 3/155* (2006.01)
*B23Q 11/00* (2006.01)

(52) U.S. Cl.
CPC ...... *B23Q 11/0825* (2013.01); *B23Q 11/0891* (2013.01); *B23Q 3/15706* (2013.01); *B23Q 3/15722* (2016.11); *B23Q 3/15766* (2013.01); *B23Q 11/10* (2013.01); *Y10T 483/115* (2015.01); *Y10T 483/1795* (2015.01); *Y10T 483/1882* (2015.01)

(58) Field of Classification Search
CPC .......... Y10T 483/1798; B23Q 3/15506; B23Q 3/15526; B23Q 3/15566; B23Q 3/15706
USPC .................................................. 483/3, 54–57
See application file for complete search history.

(56) References Cited

U.S. PATENT DOCUMENTS

| | | | |
|---|---|---|---|
| 6,364,582 B1 | 4/2002 | Hoppe et al. | |
| 6,796,890 B1 | 9/2004 | Goldrick | |
| 7,226,403 B2* | 6/2007 | Konvicka | B23Q 1/012 |
| | | | 198/346.1 |
| 9,656,363 B2* | 5/2017 | Nishida | B23Q 1/5406 |
| 2007/0042882 A1 | 2/2007 | Konvicka et al. | |
| 2014/0090517 A1* | 4/2014 | Suzuki | B23Q 11/0085 |
| | | | 74/814 |
| 2016/0158906 A1 | 6/2016 | Nishida et al. | |

FOREIGN PATENT DOCUMENTS

| | | | | |
|---|---|---|---|---|
| CN | 104768704 | | 7/2015 | |
| DE | 3545192 A | * | 6/1987 | |
| DE | 10101038 A1 | * | 7/2002 | ......... B23Q 3/15539 |
| JP | 3-107144 | | 11/1991 | |
| JP | 2002-178235 | | 6/2002 | |
| JP | 2004306185 A | * | 11/2004 | ......... B23Q 3/15533 |

\* cited by examiner

MACHINE TOOL

CROSS-REFERENCE TO RELATED APPLICATIONS

This application is a U.S. national phase patent application of International Patent Application No. PCT/JP2016/076686, filed Sep. 9, 2016, which is hereby incorporated by reference in the present disclosure in its entirety.

FIELD OF THE INVENTION

The present invention relates to a machine tool.

BACKGROUND OF THE INVENTION

In a machining chamber in which a workpiece is machined, a table for fixing a workpiece and a spindle head for holding a tool are disposed. Since chips and cutting fluid for cooling the tool are scattered in the machining chamber, a partition wall is formed so as to surround the machining chamber. Furthermore, the machine tool that includes a tool exchange device for changing a tool attached to the spindle head is known. In the machine tool including the tool exchange device, a tool storage chamber where a device for storing tools is disposed is formed. Also in the machine tool including the tool exchange device, a partition wall for shielding the tool storage chamber from the chips and the cutting fluid is formed around a machining chamber. The partition wall has an opening for moving the tool from the tool storage chamber to the machining chamber during exchange of the tool.

Japanese Unexamined Patent Publication No. 2002-178235A discloses a machine tool including a tool exchange device that provides a tool to a spindle and receives the tool from the spindle. This machine tool includes a cover serving as a partition between the tool exchange device and the spindle, which has an opening through which the spindle can pass. Moreover, the machine tool has a door that opens and closes the opening of the cover.

Japanese Unexamined Utility Model Publication No. 3-107144U discloses an opening and closing device disposed at the opening of a magazine cover. This opening and closing device also has a rotation cover that covers the top surface of a slide cover and rotates in synchronization with the slide cover.

CITATION LIST

Patent Literature

Patent Literature 1: Japanese Unexamined Patent Publication No. 2002-178235A
Patent Literature 2: Japanese Unexamined Utility Model Publication No. 3-107144U

BRIEF SUMMARY OF THE INVENTION

It is necessary that the opening formed in the partition wall between the machining chamber and the tool storage chamber is closed during a machining period. Thus, a shutter is disposed so as to open and close the opening. The shutter is opened to allow the machining chamber and the tool storage chamber to communicate with each other. A tool stored in the tool storage chamber can be changed with a tool attached to the spindle head.

During the machining period, cutting fluid splashes in various directions in the machining chamber. Even if machining is stopped to change the tools, the cutting fluid and the chips remain on the wall surface of the machining chamber. When the shutter is opened in this state, the chips and the cutting fluid may flow along the wall surface into the tool storage chamber. As a result, the device disposed in the tool storage chamber is contaminated or broken.

In order to prevent the cutting fluid from flowing into the tool storage chamber, a shutter may be disposed behind the partition wall between the machining chamber and the tool storage chamber. In this structure, the shutter is arranged away from an area where the cutting fluid is splashed, thereby the entry of the cutting fluid into the tool storage chamber is suppressed. However, since it is necessary to move the spindle head to the vicinity of the shutter, there is a problem that that the size of the shutter is enlarged. Alternatively, a device for transferring a tool from the tool storage chamber to the vicinity of the spindle head is necessary, whereby the chips or the cutting fluid may fall onto the tool transfer device from the wall surface.

An object of the present invention is to provide a machine tool that suppresses the entry of cutting fluid into a tool storage chamber when a shutter is opened in order to change tools.

The machine tool of the present invention includes a machining chamber for machining a workpiece and a tool storage chamber for storing a plurality of tools. The machine tool includes a partition wall that separates the machining chamber and the tool storage chamber and has an opening for taking tools out from the tool storage chamber, and a shutter that has a shape covering the opening and which opens and closes the opening. The machine tool includes a receiving member having an inner surface that is U-shaped in cross section so as to receive cutting fluid. The partition wall includes a side wall member extending in the vertical direction and an inclined wall member that is inclined so as to decrease in height from the side wall member toward the inside of the machining chamber. At least a part of the opening is formed in the inclined wall member. The receiving member is fixed on the side wall member so as to be adjacent to the opening under the shutter and is disposed so as to receive the cutting fluid falling along the side wall member when the shutter is opened.

The invention described above can include a nozzle for supplying the cutting fluid to the receiving member. The inclined wall member can include a first wall part disposed on one side of the opening and a second wall part disposed on the other side of the opening. The second wall part is disposed on the side where the cutting fluid flows out from the receiving member and can be disposed at a position lower than the receiving member. The first wall part can be disposed at a position higher than the receiving member. The nozzle can be disposed between the first wall part and the bottom face of the receiving member.

In the invention described above, the inclined wall member can include the first wall part disposed on one side of the opening and the second wall part disposed on the other side of the opening. The shutter can include an inclined part that is inclined so as to decrease in height toward the inside of the machining chamber. The inclined part can be disposed above the first wall part when the shutter is opened. The first wall part can be inclined more greatly than the inclined part.

The invention described above can include a shutter drive device for driving the shutter. The side wall member can include a slit extending in the movement direction of the shutter. The shutter can extend to the tool storage chamber through the slit. The shutter drive device can be disposed in the tool storage chamber and can be formed so as to drive a part of the shutter passing through the slit.

In the invention described above, the shutter can include an inclined part that is inclined so as to decrease in height toward the inside of the machining chamber and an erected part that is erected from the inclined part. The erected part can be formed in an end part on the side in which the opening is formed when the shutter is opened so as to extend along the direction in which the inclined part is inclined.

According to the present invention, a machine tool that suppresses the entry of cutting fluid into a tool storage chamber when a shutter is opened in order to change a tool can be provided.

DETAILED DESCRIPTION OF THE INVENTION

Referring to FIGS. 1 to 9, a machine tool according to an embodiment will be described below. In the present embodiment, a numerically controlled machine tool will be described as an example. The machine tool of the present embodiment includes a tool exchange device for changing a tool. The machine tool includes a machining chamber for machining a workpiece and a tool storage chamber for storing the tool.

Figure 1:
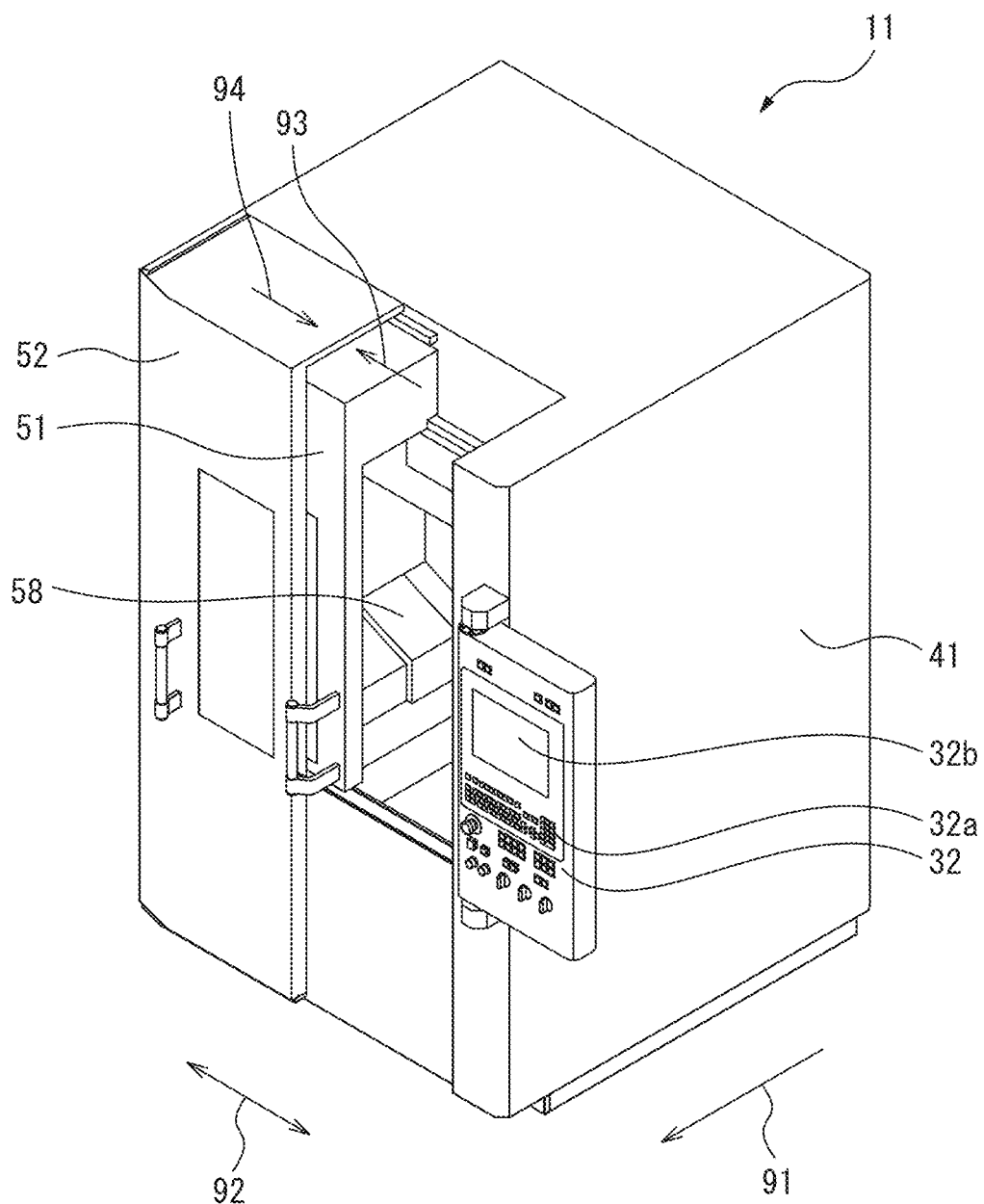
FIG. 1 is a perspective view of a machine tool when a first sliding door is opened.
Figure 2:
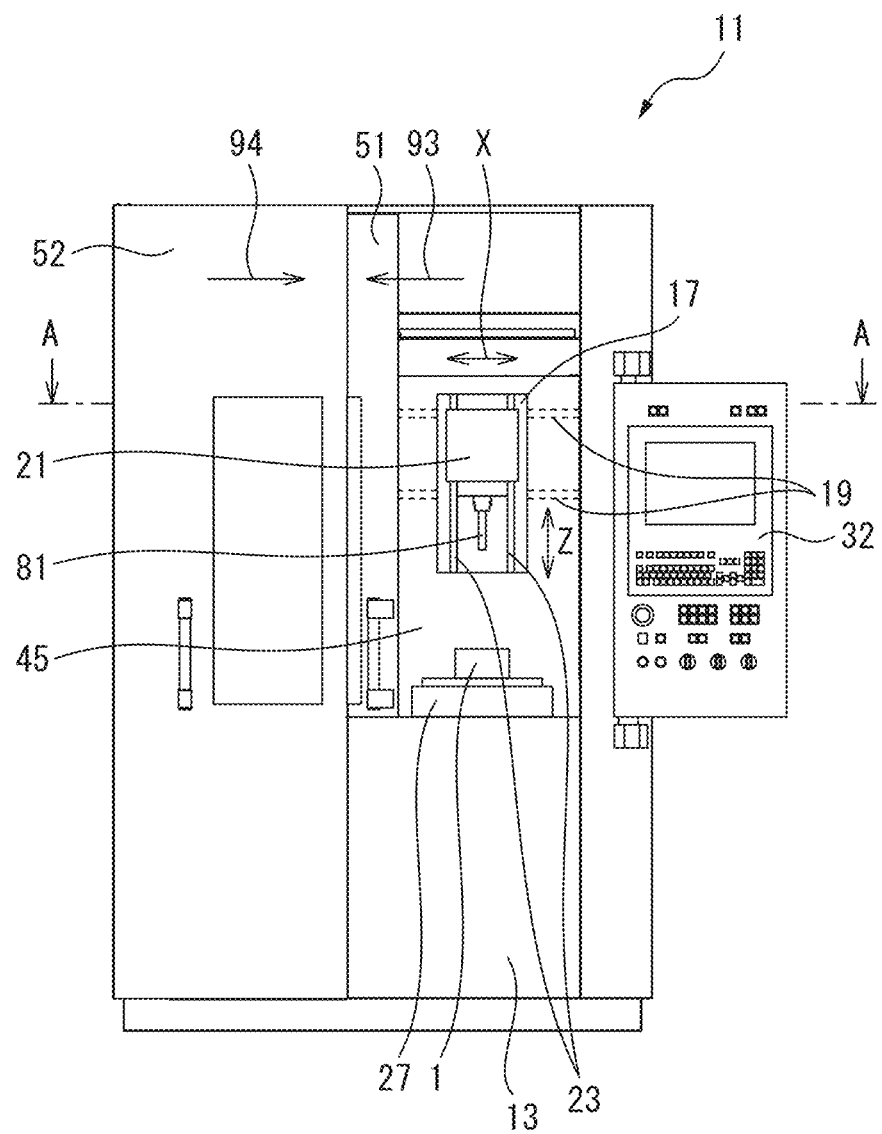
FIG. 2 is a front view of the machine tool when the first sliding door is opened.

FIG. 1 is a perspective view of the machine tool according to the present embodiment. FIG. 2 is a front view of the machine tool according to the present embodiment. Referring to FIG. 1 and FIG. 2, in the present embodiment, the side of a machine tool 11 on which an operator stands will be referred to as the front side of the machine tool 11. The direction indicated by arrow 91 corresponds to the front side of the machine tool 11. FIG. 2 illustrates the machine tool 11 viewed from the front side. Moreover, the left and right direction of the machine tool 11 is referred to as the width direction of the machine tool when an operator stands at the front side of the machine tool 11. In FIG. 1, the direction indicated by arrow 92 is the width direction of the machine tool 11.

The machine tool 11 includes a frame 41 serving as a housing. In the frame 41, a spindle head, a tool exchange device, and the like are disposed. The machine tool 11 includes a first sliding door 51 and a second sliding door 52 that are disposed at the front of the frame 41.

FIG. 1 and FIG. 2 illustrate a state in which the first sliding door is opened. The first sliding door 51 is disposed at the front side of the machining chamber when the first sliding door 51 is closed. An operator can open the first sliding door 51 by moving the first sliding door 51 as indicated by arrow 93. By opening the first sliding door 51, the operator can operate a device in a machining chamber 45. The second sliding door 52 is disposed at the front side of the tool storage chamber when the second sliding door 52 is closed. The operator can open the second sliding door 52 by moving the second sliding door 52 as indicated by arrow 94. By opening the second sliding door 52, the operator can operate a device in a tool storage chamber 46.

Figure 3:
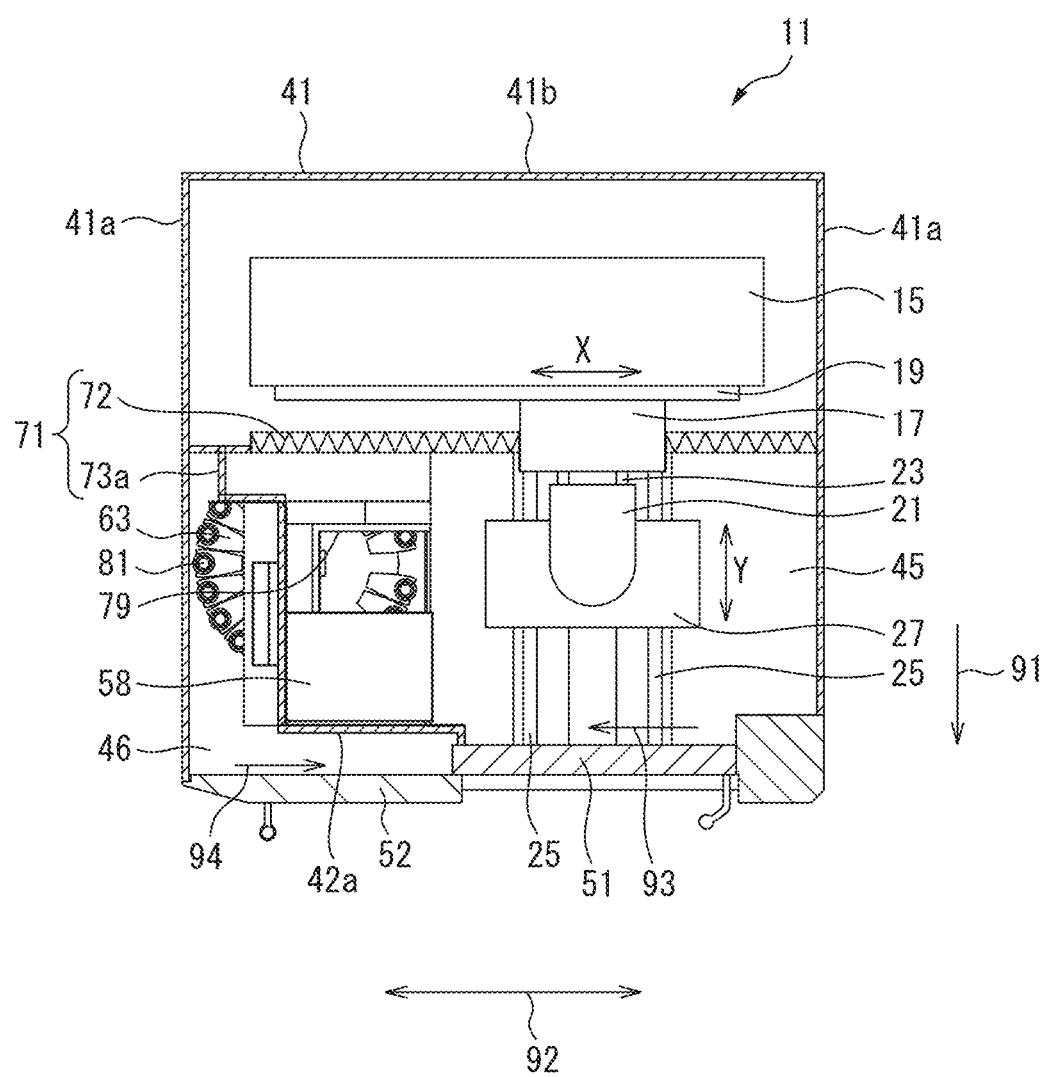
FIG. 3 is a schematic cross-sectional view of the machine tool.

FIG. 3 is a schematic cross-sectional view of the machine tool according to the present embodiment. FIG. 3 is a cross-sectional view taken along line A-A of FIG. 2. Referring to FIGS. 1 to 3, the machine tool 11 includes a bed 13 serving as a pedestal and a column 15 erected on the top surface of the bed 13. On the top surface of the bed 13, a table 27 is disposed in front of the column 15. A workpiece 1 is fixed to the table 27. At the front of the column 15, a saddle 17 is disposed. Moreover, a spindle head 21 is disposed at the front side of the saddle 17. A tool 81 for machining the workpiece 1 is attached to the spindle head 21.

The machine tool 11 includes a movement device that changes the relative positions of the tool 81 and the workpiece 1. In the present embodiment, the spindle head 21 moves in Z-axis direction extending in the vertical direction. The saddle 17 moves in the X-axis direction extending in the horizontal direction. Moreover, the table 27 moves in the Y-axis direction extending in the horizontal direction. The movement device of the present embodiment can move the tool 81 relative to the workpiece 1 in the X-axis direction, Y-axis direction, and Z-axis direction.

The movement device includes an X-axis movement device. The X-axis movement device includes a pair of X-axis rails 19 formed at the front of the column 15 and a motor for moving the saddle 17. The saddle 17 is formed so as to reciprocate along the X-axis rails 19. The spindle head 21 and the tool 81 move with the saddle 17 in the X-axis direction. The movement device includes a Y-axis movement device. The Y-axis movement device includes a pair of Y-axis rails 25 disposed on the bed 13 and a motor for moving the table 27. The table 27 is formed so as to reciprocate along the Y-axis rails 25. The workpiece 1 moves with the table 27 in the Y-axis direction.

The movement device includes a Z-axis movement device. The Z-axis movement device includes a pair of Z-axis rails 23 formed at the front of the saddle 17 and a motor for moving the spindle head 21. The spindle head 21 is formed so as to reciprocate along the Z-axis rails 23. The tool 81 moves with the spindle head 21 in the Z-axis direction and the X-axis direction. Moreover, a motor for rotating a spindle about the rotation axis is disposed in the spindle head 21.

The movement device of the present embodiment includes the three linear-motion axes. The present embodiment is not limited to this configuration. The movement device can be formed with any driving axes so as to change the position of the tool relative to the workpiece. For example, the drive axes may include a rotary feed axis.

The machine tool of the present embodiment includes a controller. The controller includes an operation panel 32 for inputting predetermined information or displaying predetermined information. The operation panel 32 has an input unit 32a including a keyboard for inputting the predetermined information and a display unit 32b for displaying information regarding machining. The controller is provided with, for example, an electronic control unit including a CPU (Central Processing Unit), RAM (Random Access Memory), and ROM (Read Only Memory) that are connected to one another via a bus. The controller controls the motor of the movement device so as to move the tool 81 relative to the workpiece 1.

Figure 4:
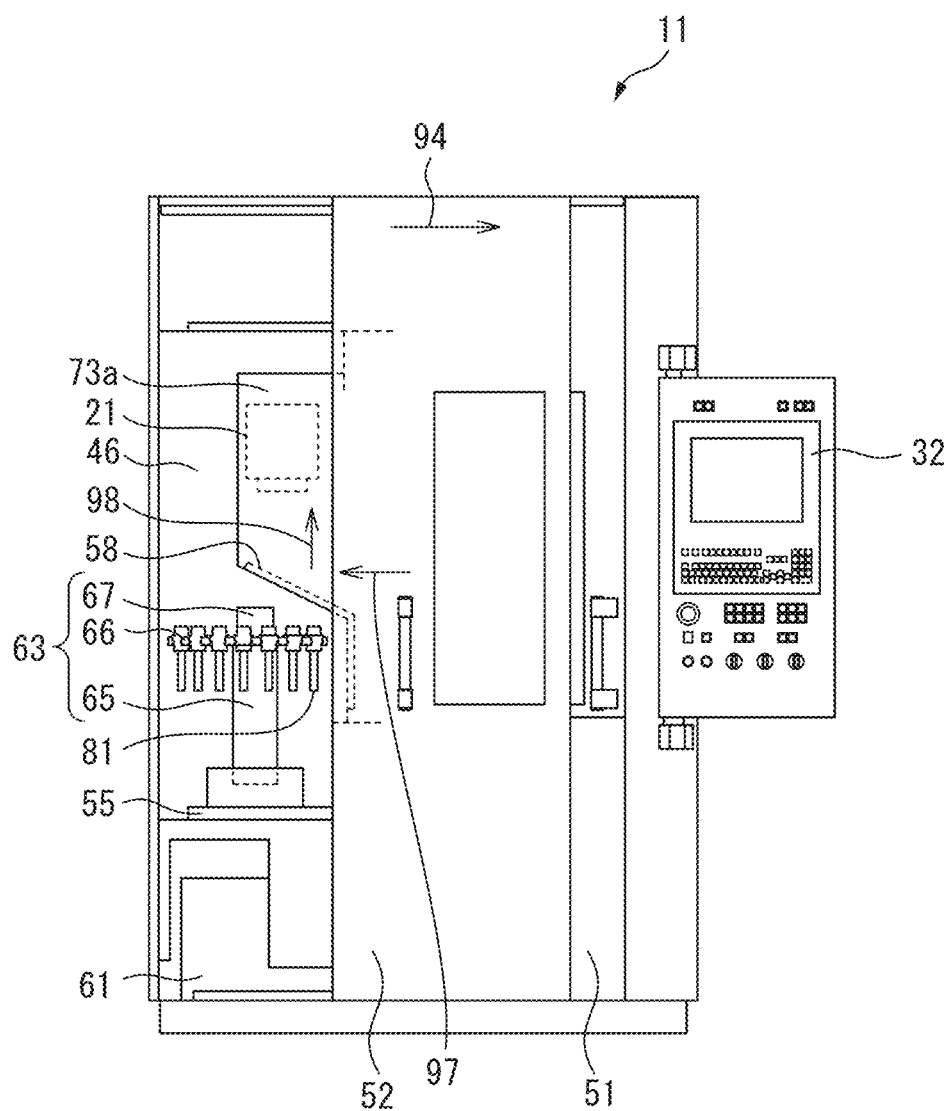
FIG. 4 is a front view of the machine tool when a second sliding door is opened.

FIG. 4 illustrates another front view of the machine tool according to the present embodiment. FIG. 4 illustrates a state in which the second sliding door 52 is opened. Referring to FIGS. 2 to 4, the machine tool 11 of the present embodiment includes the machining chamber 45 for machining the workpiece 1 and the tool storage chamber 46 for storing a plurality of tools. In the machining chamber 45, devices for machining the workpiece 1 such as the table 27 the spindle head 21 are disposed. Moreover, a device for storing tools such as a tool magazine 63 is disposed in the tool storage chamber 46.

The machining chamber 45 and the tool storage chamber 46 are disposed in the frame 41. The machining chamber 45 and the tool storage chamber 46 are separated by a partition wall 71. The partition wall 71 is disposed inside the frame 41. The partition wall 71 includes an extendable part 72 that extends or contracts according to the movement of the saddle 17 when the saddle 17 moves in the X-axis direction. The extendable part 72 is formed by a bellows, etc. The partition wall 71 includes a side wall member 73a extending in a vertical direction. The frame 41 has side panels 41a and a rear panel 41b.

The first sliding door 51 is disposed at the front side of the machining chamber 45 when the first sliding door 51 is closed. By closing the first sliding door 51, the internal space of the machining chamber 45 is closed. The machining chamber 45 is surrounded by the partition wall 71, the extendable part 72, and the side panels 41a of the frame 41. The machining chamber 45 is also surrounded by a top plate and a bottom plate. The partition wall 71, the frame 41, and the first sliding door 51 act as splash guards disposed around the machining chamber 45.

The workpiece 1 can be machined in the machining chamber 45 while the first sliding door 51 is closed. Chips and cutting fluid (coolant) scatter in the machining chamber 45 in the period in which the workpiece 1 is machined. However, the space of the machining chamber 45 is closed and thus the scattering of the chip and the cutting fluid to the outside of the machine tool 11 can be suppressed.

The machine tool 11 of the present embodiment includes a tool exchange device for automatically changing the tool 81 attached to the spindle head 21. The tool exchange device of the present embodiment is controlled by the controller of the machine tool 11. The tool exchange device includes the tool magazine 63 serving as a device for storing a plurality of the tools 81.

The tool magazine 63 of the present embodiment is a disc magazine for holding the plurality of the tools 81. The tool magazine 63 includes a disc part 66 for holding the plurality of the tools 81. The disc part 66 is disposed on the circumference part and includes grippers for holding the tools 81.

The tool magazine 63 includes a magazine base 65 supporting the disc part 66. The magazine base 65 is formed so as to be rotated about the central axis by a motor 67. The disc part 66 rotates integrally with the magazine base 65. The motor 67 includes a rotation angle detector that detects the rotation angle of the disc part 66. The any positions of the gripper can be detected by the output of the rotation angle detector. The tool magazine is not limited to the disc magazine. Any device for storing tools may be used.

The machine tool 11 of the present embodiment includes a hydraulic device 61 serving as an auxiliary device of the machine tool. The hydraulic device 61 is disposed below the tool magazine 63. The hydraulic device 61 supplies hydraulic fluid to a device driven by the hydraulic fluid. Thus, a device that is different from the tool magazine may be disposed in the tool storage chamber 46.

Figure 5:
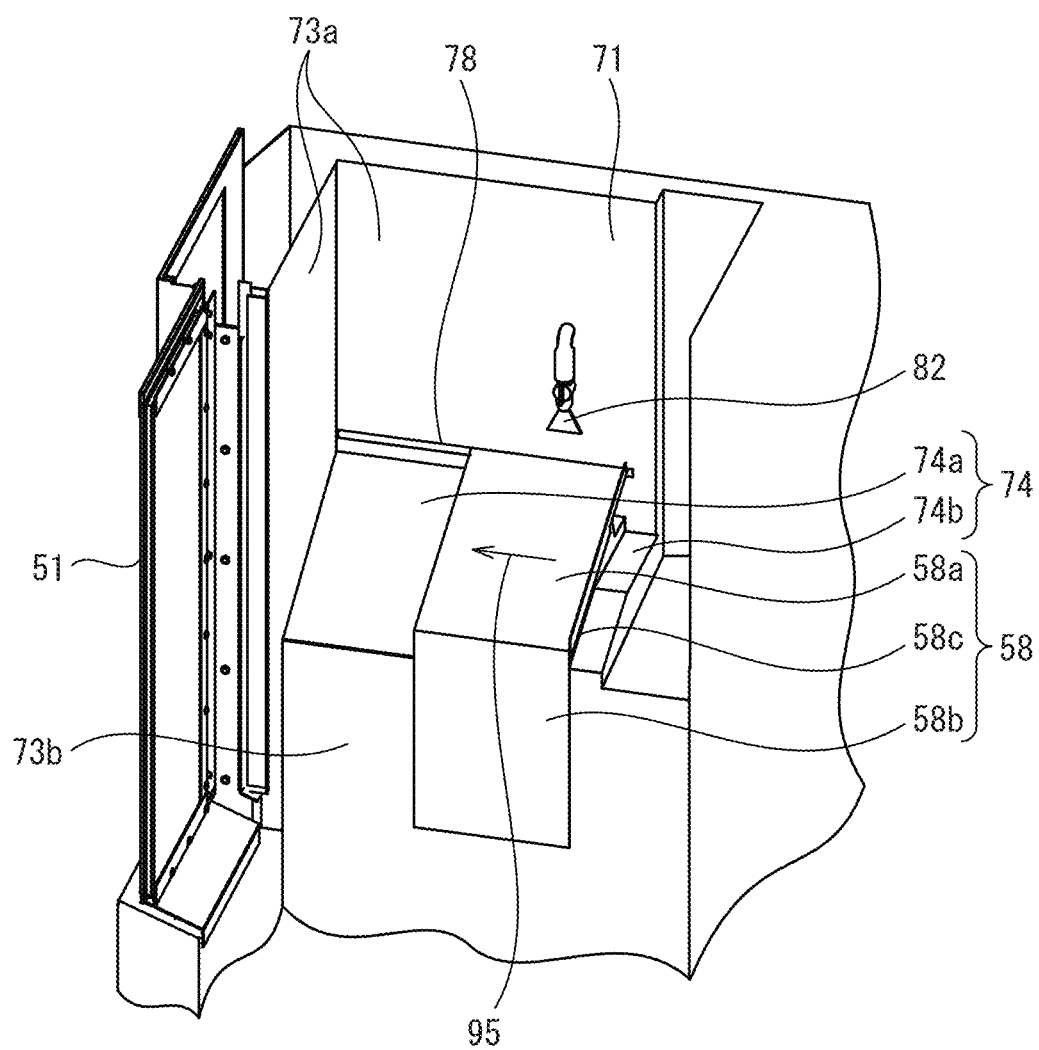
FIG. 5 is a perspective view of a partition wall and a shutter when the shutter is closed.
Figure 6:
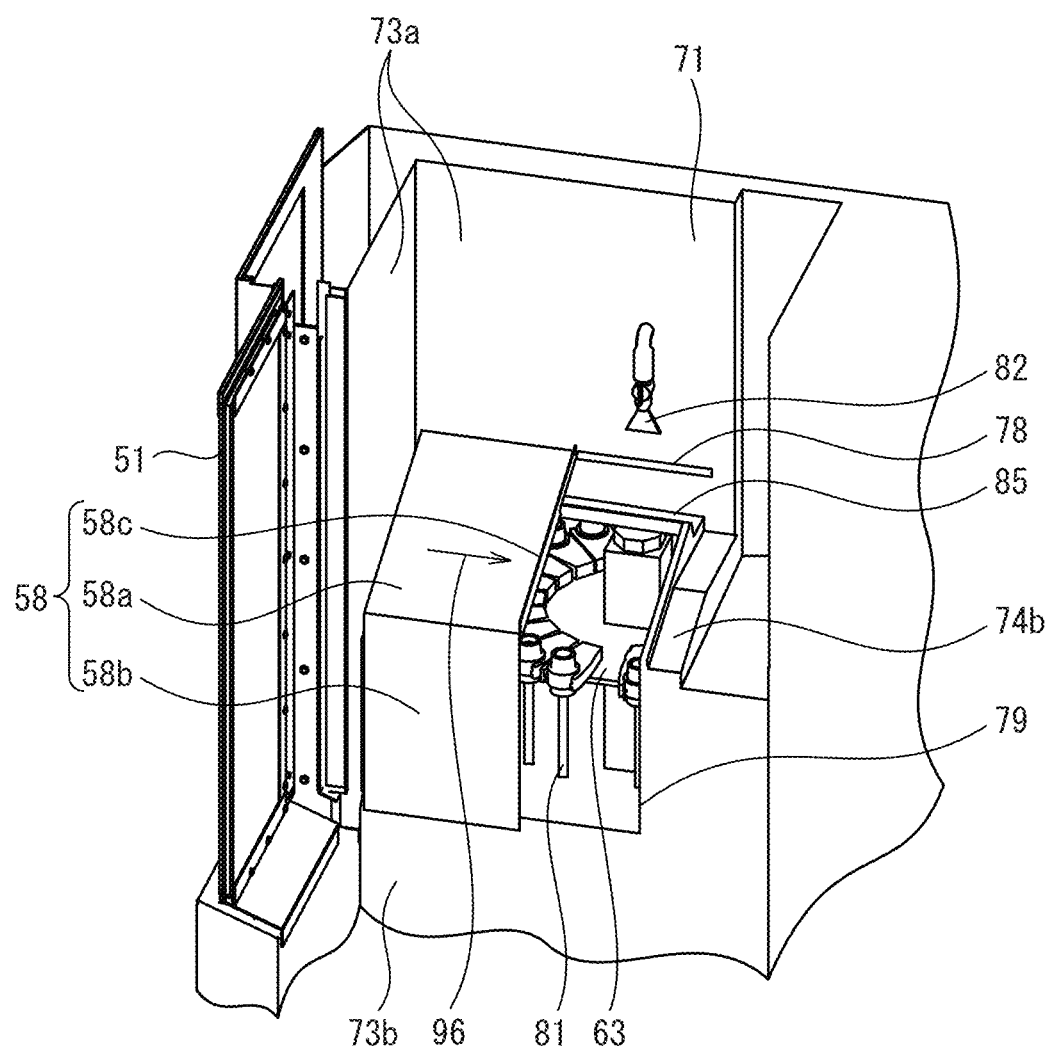
FIG. 6 is a perspective view of the partition wall and the shutter when the shutter is opened.

FIG. 5 is a perspective view of the shutter and the partition wall when the shutter is closed. FIG. 6 is a perspective view of the shutter and the partition wall when the shutter is opened. Referring to FIG. 5 and FIG. 6, the partition wall 71 has side wall members 73a and 73b. The each of the side wall members 73a and 73b has a surface that extends vertically. The partition wall 71 has an inclined wall member 74 that is inclined so as to decrease in height from the side wall members 73a and 73b toward the inside of the machining chamber. The partition wall 71 has an opening 79 that allows the machining chamber 45 and the tool storage chamber 46 to communicate with each other. At least a part of the opening 79 is formed in the inclined wall member 74. The opening 79 of the present embodiment is formed in the inclined wall member 74 and the side wall member 73b. The inclined wall member 74 has a first wall part 74a disposed on one side of the opening 79 and a second wall part 74b disposed on the other side of the opening 79.

The opening 79 of the present embodiment is formed so as to open upside of the tool magazine 63. The tool exchange device includes a shutter 58 that opens and closes the opening 79. The shutter 58 is shaped so as to cover the opening 79. The shutter 58 of the present embodiment includes an inclined part 58a that is inclined so as to decrease in height toward the inside of the machining chamber 45. The shutter 58 has a suspended part 58b vertically extending along the side wall member 73b.

The shutter 58 is formed movably along the first wall part 74a having the opening 79. By moving the shutter 58 as indicated by arrow 95, the opening 79 is exposed. Conversely, by moving the shutter 58 as indicated by arrow 96, the opening 79 is closed. The shutter 58 is closed, whereby the machining chamber 45 and the tool storage chamber 46 can be separated. In the period in which the workpiece 1 is machined, the shutter 58 is closed. A nozzle 82 for spraying the cutting fluid during the machining period is arranged on the side wall member 73a.

Referring to FIG. 3 and FIG. 4, when the tool 81 held by the spindle head 21 is changed, the tool magazine 63 adjusts the rotational position of the disc part 66 in order to receive the tool 81 held by the spindle head 21. A gripper that does not hold the tool 81 is arranged immediately below the opening 79 by the tool magazine 63.

The movement device places the spindle head 21 in front of the tool magazine 63. The shutter 58 is opened, whereby the machining chamber 45 and the tool storage chamber 46 communicate with each other. Subsequently, the spindle head 21 moves down to the same height as the gripper of the tool magazine 63 through the opening 79. The spindle head 21 then horizontally moves as indicated by arrow 97, so that the tool 81 supported by the spindle head 21 is held by the gripper of the tool magazine 63. The spindle head 21 cancels the holding of the tool 81.

Subsequently, the spindle head 21 moves upward as indicated by arrow 98 and separates from the tool magazine 63. The tool magazine 63 adjusts the rotational position of the disc part 66 in order to attach another tool 81 to the spindle head 21. Another tool 81 is arranged immediately below the opening 79 by the tool magazine 63. The spindle head 21 then moves downward so as to attach the desired tool 81 to the spindle head 21. Thereafter, the spindle head 21 moves horizontally so as to remove the tool 81 from the gripper. The spindle head 21 then moves upward and separates from the tool magazine 63. By closing the shutter 58, the internal space of the machining chamber 45 is closed.

The shutter drive device for driving the shutter 58 will be described below. The machine tool 11 of the present embodiment drives the shutter 58 with pneumatic pressure.

Figure 7:
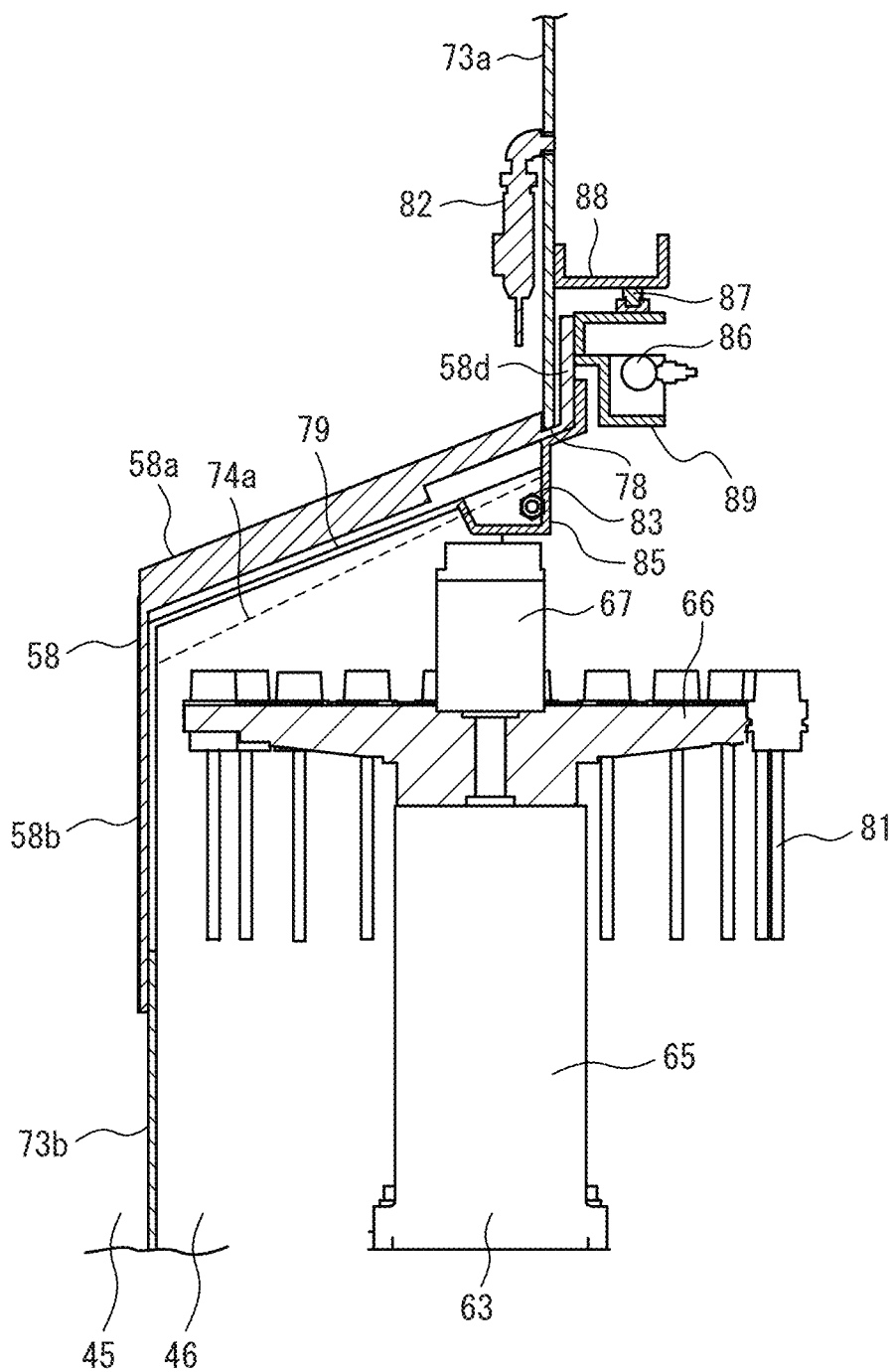
FIG. 7 is a schematic partial cross-sectional view of the part of the shutter and a tool magazine.

FIG. 7 is a schematic partial cross-sectional view of the machine tool according to the present embodiment. FIG. 7 is a partial cross-sectional view that is vertically cut along the part in which the nozzle 82 is arranged. Referring to FIGS. 5 to 7, a slit 78 through which the shutter 58 passes is formed in the side wall member 73a. The slit 78 is a hole extending in the movement direction of the shutter 58. The slit 78 of the present embodiment extends in the front-back direction of the machine tool. The shutter 58 has a guide part 58d disposed on the back of the side wall member 73a. The guide part 58d extends from the inclined part 58a. The guide part 58d is connected to a barrel 86 via a support member 89.

A guide rail 87 is disposed on the back surface of the side wall member 73a via a support member 88. The guide rail 87 extends in the movement direction in which the shutter 58 moves. The support member 89 is formed so as to move along the guide rail 87. The barrel 86 acting as a drive source is fixed to the support member 89. The barrel 86 is driven by pneumatic pressure so as to move the support member 89 along the guide rail 87. Since the guide part 58d is fixed to the support member 89, the barrel 86 is driven so as to move the shutter 58 in the front-back direction of the machine tool 11.

As described above, the shutter 58 of the present embodiment extends to the tool storage chamber 46 through the slit 78. The shutter drive device is disposed in the tool storage chamber 46. The shutter drive device is formed so as to drive a part of the shutter 58 passing through the slit 78. By adopting this configuration, the adhesion of the cutting fluid and the chips on the shutter drive device can be suppressed. The occurrence of failures of the shutter drive device can be suppressed.

The shutter drive device of the present embodiment is formed so as to drive the shutter by the pneumatic pressure. The present invention is not limited to this configuration. The shutter can be driven by any mechanism. For example, the shutter drive device can be formed so as to drive the shutter by another fluid such as hydraulic fluid. Alternatively, the shutter drive device may be formed so as to drive the shutter by a motor.

Figure 8:
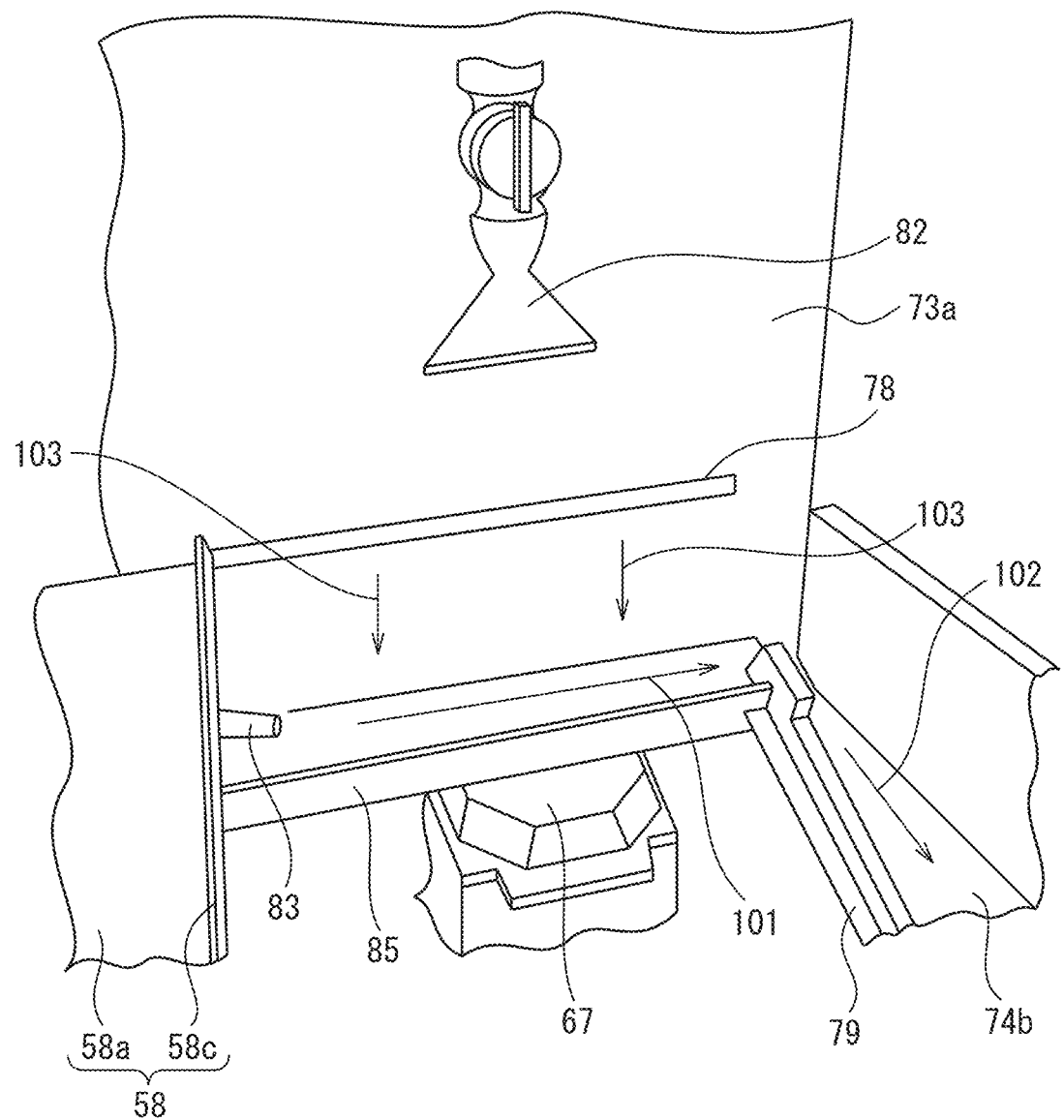
FIG. 8 is a perspective view of an opening and a receiving member when the shutter is opened.

FIG. 8 is an enlarged perspective view for illustrating the part of the opening and the nozzle according to the present embodiment. FIG. 8 illustrates a state in which the shutter 58 is opened. Referring to FIGS. 6 to 8, the machine tool 11 includes a receiving member 85 that receives the cutting fluid. The receiving member 85 is fixed to the side wall member 73a. The receiving member 85 is disposed adjacent to the opening 79. The receiving member 85 is formed over one side of the opening 79 in one direction. The receiving member 85 is shaped so as to open upward. The receiving member 85 has a U-shaped inner surface in cross section. The receiving member 85 is shaped like a gutter. The receiving member 85 functions as a channel in which the cutting fluid flows. The receiving member 85 is disposed below the shutter 58. The receiving member 85 is disposed so as to receive the cutting fluid falling along the side wall member 73a when the shutter 58 is opened.

During the period in which the workpiece 1 is machined in the machining chamber 45, the cutting fluid is injected in various directions in the machining chamber 45. The cutting fluid has the function of cooling the workpiece 1 and the tool 81 and washing off the chips. For example, referring to FIG. 5, the cutting fluid is injected from the nozzle 82 in the period during which the shutter 58 is closed and the workpiece 1 is machined. The cutting fluid and the chips on the shutter 58 and the inclined wall member 74 can be washed off.

Referring to FIG. 6 and FIG. 8, when the tool 81 attached to the spindle is changed, the machining is stopped in the machining chamber 45. The injection of the cutting fluid from the nozzle 82 or the like is stopped. Thereafter, the shutter 58 is opened so as to change the tool 81. At this time, the cutting fluid and the chips on the side wall member 73a may fall along the side wall member 73a as indicated by arrows 103.

In the machine tool 11 of the present embodiment, the receiving member 85 can receive the cutting fluid and the chips that fall along the side wall member 73a. Thus, the entry of the cutting fluid and the chips from the machining chamber 45 into the tool storage chamber 46 can be suppressed. After the tool 81 is changed, the shutter 58 is closed. Subsequently, the workpiece 1 is machined in the machining chamber 45.

The inclined wall member 74 of the present embodiment has the second wall part 74b. The second wall part 74b is disposed on a side where the cutting fluid flows out from the receiving member 85. The second wall part 74b is formed so as to receive the cutting fluid flowing from the receiving member 85. The second wall part 74b is disposed at a position lower than the receiving member 85. The second wall part 74b is formed so as to gradually decrease in height toward the inside of the machining chamber 45. The second wall part 74b is formed so as to pass the cutting fluid into the machining chamber 45.

The machine tool 11 of the present embodiment includes a nozzle 83 for supplying the cutting fluid into the receiving member 85. When the machining is started in the machining chamber 45, the cutting fluid is supplied from the nozzle 83. Subsequently, the cutting fluid and the chips that are received by the receiving member 85 flow in the receiving member 85 as indicated by arrow 101. The cutting fluid and the chips then fall to the second wall part 74b. Thereafter, the cutting fluid and the chips flow on the surface of the second wall part 74b as indicated by arrow 102. The cutting fluid and the chips flow into the machining chamber 45. A collection device for collecting the cutting fluid and the chips is disposed at the bottom part of the machining chamber 45. Thus, the cutting fluid and the chips that have fallen into the receiving member 85 can be passed to the collection device of the machine tool 11.

Referring to FIG. 7 and FIG. 8, the first wall part 74a is disposed at a position higher than the receiving member 85. The nozzle 83 of the present embodiment is disposed between the shutter 58 and the bottom face of the receiving member 85. The nozzle 83 is disposed between the first wall part 74a and the bottom face of the receiving member 85. By adopting this configuration, the cutting fluid can be supplied to the receiving member 85 while the shutter 58 is closed. During the machining period, the cutting fluid and the chips that have fallen into the receiving member 85 can be passed to the collection device.

Figure 9:
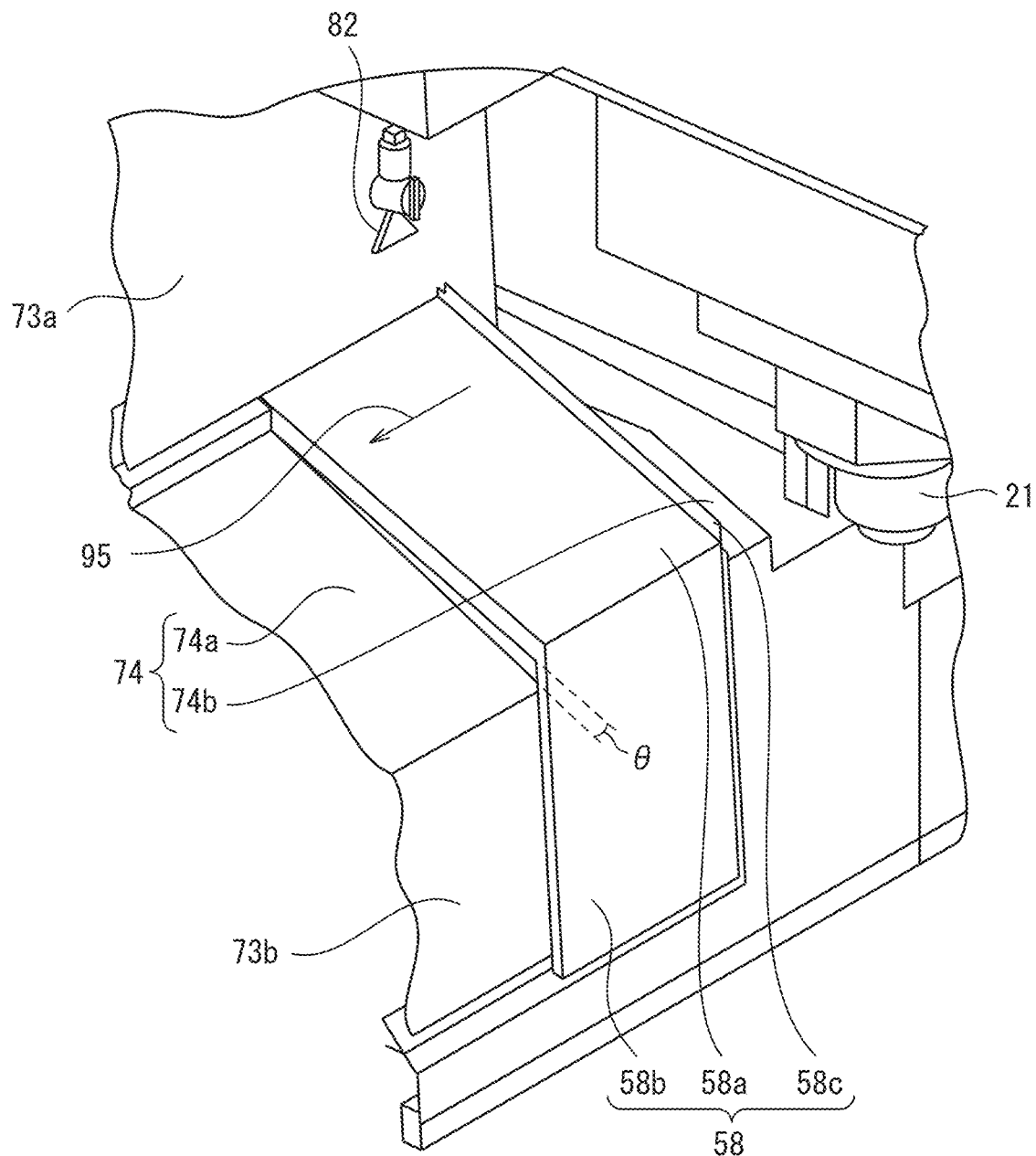
FIG. 9 is a perspective view of a shutter and a partition wall when the shutter is closed.

FIG. 9 is an enlarged perspective view of the part of the shutter according to the present embodiment. FIG. 9 illustrates a state in which the shutter is closed. The shutter 58 has an erected part 58c that is erected from the inclined part 58a. The erected part 58c is formed in one end part on the side in which the opening 79 is formed when the shutter 58 is opened. The erected part 58c is formed in the end part in the direction that is opposite to the direction in which the shutter moves when the shutter 58 is opened. The erected part 58c of the present embodiment is shaped like a plate. The erected part 58c extends in the direction in which the inclined part 58a is inclined. The erected part 58c is formed over the inclined part 58a in the longitudinal direction. The erected part 58c functions as a wall part for stopping the flow of the cutting fluid.

In the period in which the workpiece is machined, since the cutting fluid is discharged, the cutting fluid and the chips adhere to the surface of the shutter 58. In order to change the tool, the shutter 58 moves as indicated by arrow 95. At this time, the cutting fluid and the chips may fall from one end of the inclined part 58a, which is opposite to the movement direction of the shutter 58 due to the inertia of the cutting fluid and the chips. Thus, the cutting fluid and the chips may fall into the tool storage chamber 46 through the opening 79.

In the present embodiment, the erected part 58c prevents the cutting fluid and the chips from falling from the end which is opposite to the movement direction of the shutter 58. When the shutter 58 is opened, the cutting fluid and the chips collide with the erected part 58c. Thereafter, the cutting fluid and the chips move along the direction in which the erected part 58c extends. In other words, the cutting fluid and the chips are moved to the inside of the machining chamber 45 by the inclination of the inclined part 58a. This can suppress the falling of the cutting fluid and the chips into the opening 79.

In the present embodiment, the erected part 58c is formed on the inclined part 58a. The present embodiment is not limited to this configuration. The erected part may be formed on the suspended part 58b as well as the inclined part 58a. The erected part is not always shaped like a plate and may have any shape for stopping the flow of the cutting fluid and the chips.

Moreover, the first wall part 74a of the inclined wall member 74 has an inclination angle which is different from the inclined part 58a of the shutter 58. The first wall part 74a has an inclination which is greater than the inclined part 58a of the shutter 58. The angle difference □ of the inclination angle is, for example, 3 □ to less than 10 □. When the shutter 58 is opened, a clearance is formed between the first wall part 74a and the inclined part 58a. The clearance is formed so as to gradually increase toward the inside of the machining chamber 45.

The inclined part 58a is disposed above the first wall part 74a when the shutter 58 is opened. When the shutter 58 is opened, a foreign matter such as the chip may enter between the first wall part 74a and the inclined part 58a. In this case, the inclined part may have the same inclination angle as the first wall part. The inclined part may be formed in parallel with the first wall part. In this case, however, the foreign matter may enter between the first wall part and the inclined part. The movement of the shutter may be prevented. In other words, the shutter may fail.

The machine tool 11 of the present embodiment may also be formed so as to gradually enlarge the clearance between the first wall part 74a and the inclined part 58a. Even if the foreign matter enters between the first wall part 74a and the inclined part 58a, the foreign matter can be moved into the machining chamber where the clearance is large. Thus, the foreign matter is easily discharged. The entry of the foreign matter between the first wall part 74a and the inclined part 58a can be suppressed. The occurrence of failures of the shutter 58 can be suppressed.

The embodiments described above may be suitably combined with another. In the drawings, the same or equivalent parts are assigned the same reference numerals. The foregoing embodiments are merely exemplary and do not limit the invention. The embodiments includes the modifications described in the claims.

REFERENCE SIGNS LIST 11 machine tool
45 machining chamber
46 tool storage chamber
58 shutter
58a inclined part
58c erected part
63 tool magazine
71 partition wall
72 extendable part
73a side wall member
74 inclined wall member
74a first wall part
74b second wall part
78 slit
79 opening
81 tool
83 nozzle
85 receiving member
86 barrel

The invention claimed is:

1. A machine tool comprising:
a machining chamber for machining a workpiece;
a tool storage chamber for storing a plurality of tools;
a partition wall that separates the machining chamber and the tool storage chamber, the partition wall having an opening through which the plurality of tools are taken out from the tool storage chamber;
a shutter that has a shape that corresponds to the opening, and when the shutter is disposed in a first position the shutter covers the opening such that the opening is closed, and when the shutter is disposed in a second position the opening is exposed; and
a receiving member having an inner surface that is U-shaped in cross section so as to receive a cutting fluid, wherein
the partition wall includes a side wall member extending in a vertical direction and an inclined wall member that is inclined so as to decrease in height from the side wall member toward inside of the machining chamber,
at least a part of the opening is formed in the inclined wall member, and
the receiving member is fixed on the side wall member so as to be adjacent to the opening under the shutter and is disposed so as to receive the cutting fluid falling along the side wall member when the shutter is opened.

2. The machine tool according to claim 1, further comprising:
a nozzle for supplying the cutting fluid to the receiving member, wherein
the inclined wall member includes a first wall part disposed on a first side of the opening and a second wall part disposed on an opposing second side of the opening,
the second wall part is disposed on the second side of the opening where the cutting fluid flows out from the receiving member, and is disposed at a position lower than the receiving member, the first wall part is disposed at a position higher than the receiving member, and the nozzle is disposed between the first wall part and a bottom face of the receiving member.

3. The machine tool according to claim 1, wherein the inclined wall member includes a first wall part disposed on a first side of the opening and a second wall part disposed on an opposing second side of the opening, the shutter includes an inclined part that is inclined so as to decrease in height toward the inside of the machining chamber, the inclined part is disposed above the first wall part when the shutter is opened, and the first wall part is inclined more greatly than the inclined part.

4. The machine tool according to claim 1, further comprising:

a shutter drive device for driving the shutter, wherein the side wall member includes a slit extending in a movement direction of the shutter, the shutter extends to the tool storage chamber through the slit, and the shutter drive device is disposed in the tool storage chamber and is formed so as to drive a part of the shutter passing through the slit.

5. The machine tool according to claim 1, wherein the shutter includes an inclined part that is inclined so as to decrease in height toward the inside of the machining chamber and an erected part that extends outward from the inclined part, and the erected part is formed at an end part of the inclined part, and when the shutter is opened, the erected part is disposed adjacent a first side of the opening, and the erected part extending along a direction in which the inclined part is inclined.

\* \* \* \* \*